US009111176B2

(12) United States Patent
Hamada

(10) Patent No.: US 9,111,176 B2
(45) Date of Patent: Aug. 18, 2015

(54) IMAGE MATCHING DEVICE, IMAGE MATCHING METHOD AND IMAGE MATCHING PROGRAM

(75) Inventor: Yasushi Hamada, Tokyo (JP)

(73) Assignee: NEC CORPORATION, Tokyo (JP)

(*) Notice: Subject to any disclaimer, the term of this patent is extended or adjusted under 35 U.S.C. 154(b) by 1147 days.

(21) Appl. No.: 12/922,622

(22) PCT Filed: Apr. 24, 2009

(86) PCT No.: PCT/JP2009/058146
§ 371 (c)(1),
(2), (4) Date: Sep. 14, 2010

(87) PCT Pub. No.: WO2009/131209
PCT Pub. Date: Oct. 29, 2009

(65) Prior Publication Data
US 2011/0019921 A1    Jan. 27, 2011

(30) Foreign Application Priority Data
Apr. 24, 2008  (JP) .................................. 2008-114395

(51) Int. Cl.
G06K 9/62    (2006.01)

(52) U.S. Cl.
CPC ............ *G06K 9/6211* (2013.01); *G06K 9/6212* (2013.01); *G06K 2009/6213* (2013.01)

(58) Field of Classification Search
USPC .................................. 382/156, 190, 195, 218
See application file for complete search history.

(56) References Cited

U.S. PATENT DOCUMENTS

| 5,647,024 | A | 7/1997 | Kawauchi et al. | |
|---|---|---|---|---|
| 2003/0190076 | A1 | 10/2003 | DeLean | |
| 2003/0215141 | A1* | 11/2003 | Zakrzewski et al. | 382/190 |
| 2004/0052418 | A1 | 3/2004 | DeLean | |
| 2005/0084155 | A1* | 4/2005 | Yumoto et al. | 382/190 |
| 2007/0252898 | A1 | 11/2007 | DeLean | |

FOREIGN PATENT DOCUMENTS

| JP | 6-28461 A | 2/1994 |
|---|---|---|
| JP | 6-512136 A | 8/1994 |

(Continued)

OTHER PUBLICATIONS

Tomokazu Kawahara et al., Personal Identification Using Global Struture of Minute Facial Skin Features, SICE, 2004, pp. 619-620.

*Primary Examiner* — Chan Park
*Assistant Examiner* — Elisa Rice
(74) *Attorney, Agent, or Firm* — Foley & Lardner LLP

(57) ABSTRACT

Image matching device 300 of the invention includes feature image extracting sections 303, 304 extracting one or more partial object images containing a local structural feature from an object image and extracting one or more partial reference images containing the local structural feature from each reference image, first image detecting section 306 setting each of the partial object images as an image of interest and detecting a first partial image most similar to the image of interest from a set of partial reference images, second image detecting section 307 detecting a second partial image most similar to the first partial image from a set of partial object images, and determination processing section 305 determining whether or not the image of interest matches the second partial image and outputting the result of the determination.

33 Claims, 5 Drawing Sheets

(56) References Cited

FOREIGN PATENT DOCUMENTS

| | | |
|---|---|---|
| JP | 7-250247 A | 9/1995 |
| JP | 9-161059 A | 6/1997 |
| JP | 11-25269 A | 1/1999 |
| JP | 2003-216952 A | 2/2005 |
| JP | 2005-50251 A | 2/2005 |
| JP | 2005-84012 A | 3/2005 |
| JP | 2005-521975 A | 7/2005 |
| JP | 2006-107288 A | 4/2006 |

* cited by examiner feature space

○ : feature quantities of images that belong to a set Rg of partial reference images □ : feature quantities of images that belong to a set Og of partial object images feature space ○ : feature quantities of images that belong to a set Rg of partial reference images □ : feature quantities of images that belong to a set Og of partial object images

IMAGE MATCHING DEVICE, IMAGE MATCHING METHOD AND IMAGE MATCHING PROGRAM

This application is the National Phase of PCT/JP2009/058146, filed Apr. 24, 2009, which claims priority to Japanese Application No. 2008-114395, filed Apr. 24, 2008, the disclosures of which are hereby incorporated by reference in their entirety.

TECHNICAL FIELD

The present invention relates to an image matching technique.

BACKGROUND ART

Image matching is a technique that matches an image against one or more reference images to determine whether or not the image matches any of the reference images. Image matching technique of this type is used in matching a facial image or a fingerprint image captured by an image pickup device against registered images stored previously in a database, for example. In this example, the facial image and fingerprint image are images to be matched and the registered images are reference images. In conventional biometric image matching techniques, global structural features unique to a living individual (for example, the eyes, the eyebrows, and the mouth) are matched. Since global structural features are fixed in number and are in almost fixed positions, matching based on global structural features can be performed with relative ease.

However, it is difficult to perforin matching of images of living individuals that have extremely similar global structural features, such as a twin, with a high degree of accuracy with the matching technique. Therefore, matching techniques based on acquired local structural features (for example, skin traits such as moles, freckles and wrinkles, and fingerprints), in addition to global structural features have been proposed.

Related-art documents concerning the image matching technique include JP2006-107288A (hereinafter referred to as Patent document 1), JP06-28461A (hereinafter referred to as Patent document 2) and JP2005-521975 (hereinafter referred to as Patent document 3).

Patent document 1 discloses a personal verification technique in which skin texture such as moles, flecks and freckles are detected and the detected pattern is matched against feature patterns registered in a database. Patent document 2 discloses a fingerprint matching technique in which a window image is extracted on the basis of a global structural feature in a fingerprint image and matching is performed on feature points (minutiae) such as branches and ends of a fingerprint that appear in the window image. Patent document 3 discloses a personal verification technique in which a reference image is searched, a group of pixels that is the best match for a group of pixels in an object image (acquired image) is selected, and the probability that the relative locations of the selected group of pixels and the group of pixels in the object image randomly occur is determined.

DISCLOSURE OF THE INVENTION

However, local structural features are not always stable. The positions and shapes of local structural features (for example, feature points such as moles, flecks and freckles) can change due to external factors and such changes can decrease the accuracy of matching. For example, if the expression of a subject changes from usual expression or the appearance of the subject changes from usual appearance due to shooting conditions when an image pickup device attempts to capture an image of the subject to acquire an object image, the accuracy of matching of the object image will degrade.

To address the problem and improve the accuracy of matching, the technique disclosed in Patent document 3 selects a pixel group from a reference image that matches a pixel group in an object image to search the reference image. The technique disclosed in Patent document 3 can prevent the above-mentioned decrease in matching accuracy caused by external factors. However, the processing load of the search is so large that the speed of matching is disadvantageously decreases.

An exemplary object of the invention is to provide an image matching device, image matching method, and image matching program capable of image matching processing based on a local structural feature with a small amount of computation and a high degree of accuracy.

An image matching device according to an exemplary aspect of the invention, which matches an object image against one or more reference images, includes: a feature image extracting section extracting one or more partial object images containing a local structural feature from the object image and extracting one or more partial reference images containing a local structural feature from each of the reference images; a first image detecting section setting each of the partial object images as an image of interest and detecting a first partial image most similar to the image of interest from a set of the partial reference images; a second image detecting section detecting a second partial image most similar to the first partial image from a set of the partial object images; and a determination processing section determining whether or not the image of interest matches the second partial image and outputting the result of the determination.

An image matching method according to an exemplary aspect of the invention, which is for matching an object image against one or more reference images, includes: performing a feature image extracting step of extracting one or more partial object images containing a local structural feature from the object image and extracting one or more partial reference images containing a local structural feature from each of the reference images; performing a first image detecting step of setting each of the partial object images as an image of interest and detecting a first partial image most similar to the image of interest from a set of the partial reference images; performing a second image detecting step of detecting a second partial image most similar to the first partial image from a set of the partial object images; and performing a determination processing step of determining whether or not the image of interest matches the second partial image and outputting the result of the determination.

An image matching program according to an exemplary aspect of the invention, which causes a computer to execute a process for matching an object image against one or more reference images, includes: a feature image extracting step of extracting one or more partial object images containing a local structural feature from the object image and extracting one or more partial reference images containing a local structural feature from each of the reference images; a first image detecting step of setting each of the partial object images as an image of interest and detecting a first partial image most similar to the image of interest from a set of the partial reference images; a second image detecting step of detecting a second partial image most similar to the first partial image from a set of the partial object images; and a determination processing step of determining whether or not the image of interest matches the second partial image and outputting the result of the determination.

Figure 1:
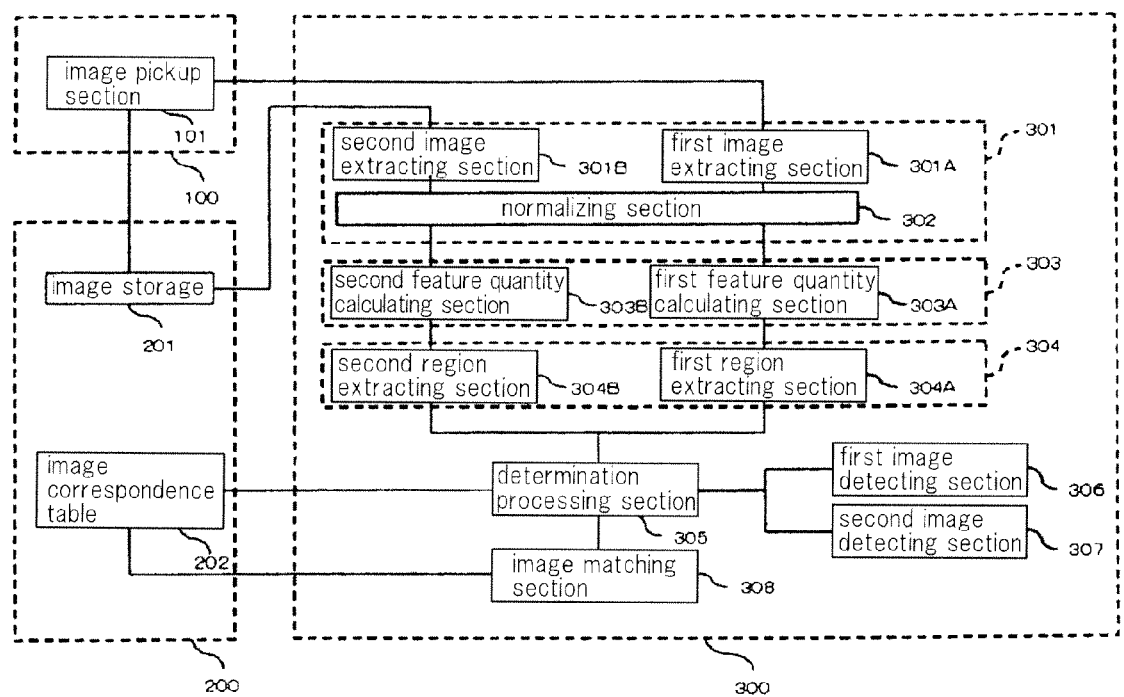
FIG. 1 is a functional block diagram schematically illustrating an image matching system according to one exemplary embodiment of the present invention.

DESCRIPTION OF SYMBOLS 100 measuring device
101 image pickup section
200 storage device
201 image storage
202 image correspondence table
300 image matching device
301 image-to-be-matched extracting section
301A first image extracting section
301B second image extracting section
302 normalizing section
303 feature quantity calculating section
303A first feature quantity calculating section
303B second feature quantity calculating section
304 region extracting section
304A first region extracting section
304B second region extracting section
305 determination processing section
306 first image detecting section
307 second image detecting section
308 image matching section

BEST MODE FOR CARRYING OUT THE INVENTION

Exemplary embodiments of the present invention will be described below with reference to drawings. Like elements are given like reference numerals throughout the drawings and repeated detailed description of the elements will be omitted as appropriate.

FIG. 1 is a functional block diagram schematically illustrating an image matching system according to one exemplary embodiment of the present invention. The image matching system includes measuring device 100, storage device 200 and image matching device 300.

Measuring device 100 includes image pickup section 101. Image pickup section 101 includes a solid-state image pickup device such as a CCD (Charge Coupled Device) image pickup device or a CMOS (Complementary Metal Oxide Semiconductor) image pickup device, a focus system which focuses incident light from a subject onto the solid-state image pickup device, and a signal processor which applies image processing to output from the solid-stage image pickup device. Image pickup section 101 can output image data to image storage 201 or image matching device 300. Storage device 200 includes a recording medium such as a volatile or nonvolatile memory (for example a semiconductor memory or a magnetic recording medium) and a control circuit and a program for writing and reading data on the recording medium. Storage device 200 includes image storage 201 storing image data input from image pickup section 101 and image correspondence table 202.

Image matching device 300 includes image-to-be matched extracting section 301, feature quantity calculating section 303, region extracting section 304, determination processing section 305, first image detecting section 306, second image detecting section 307, and image matching section 308. All or some of functional blocks 301 and 303 to 308 may be implemented by hardware such as a semiconductor integrated circuit or by a program or a program code recorded on a recording medium such as a nonvolatile memory or an optical disc. Such program or program code causes a computer including a processor such as a CPU (Central Processing unit) to execute image matching processing of functional blocks 301 and 303 to 308.

Figure 2:
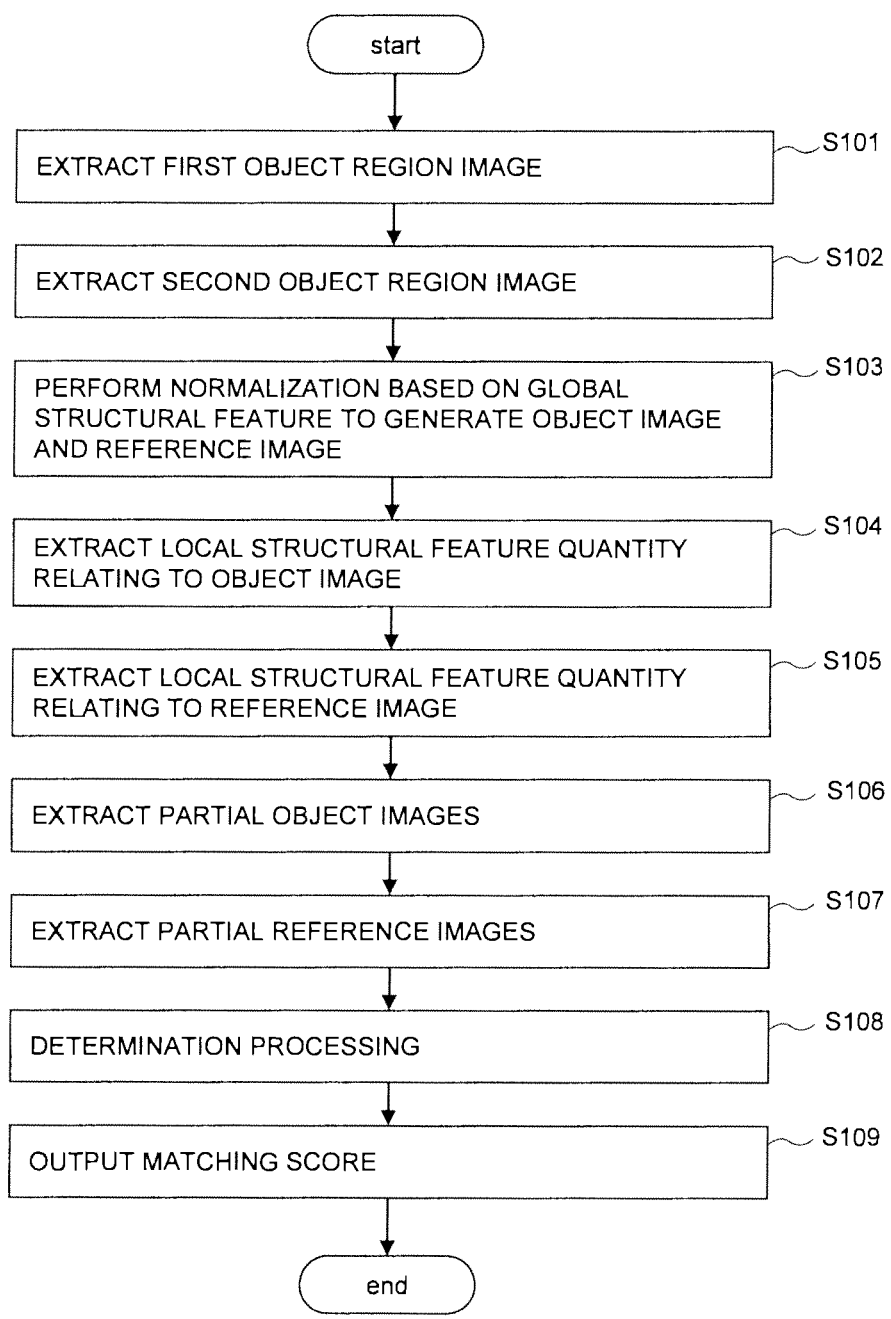
FIG. 2 is a flowchart schematically illustrating a process procedure performed by an image matching device.
Figure 3:
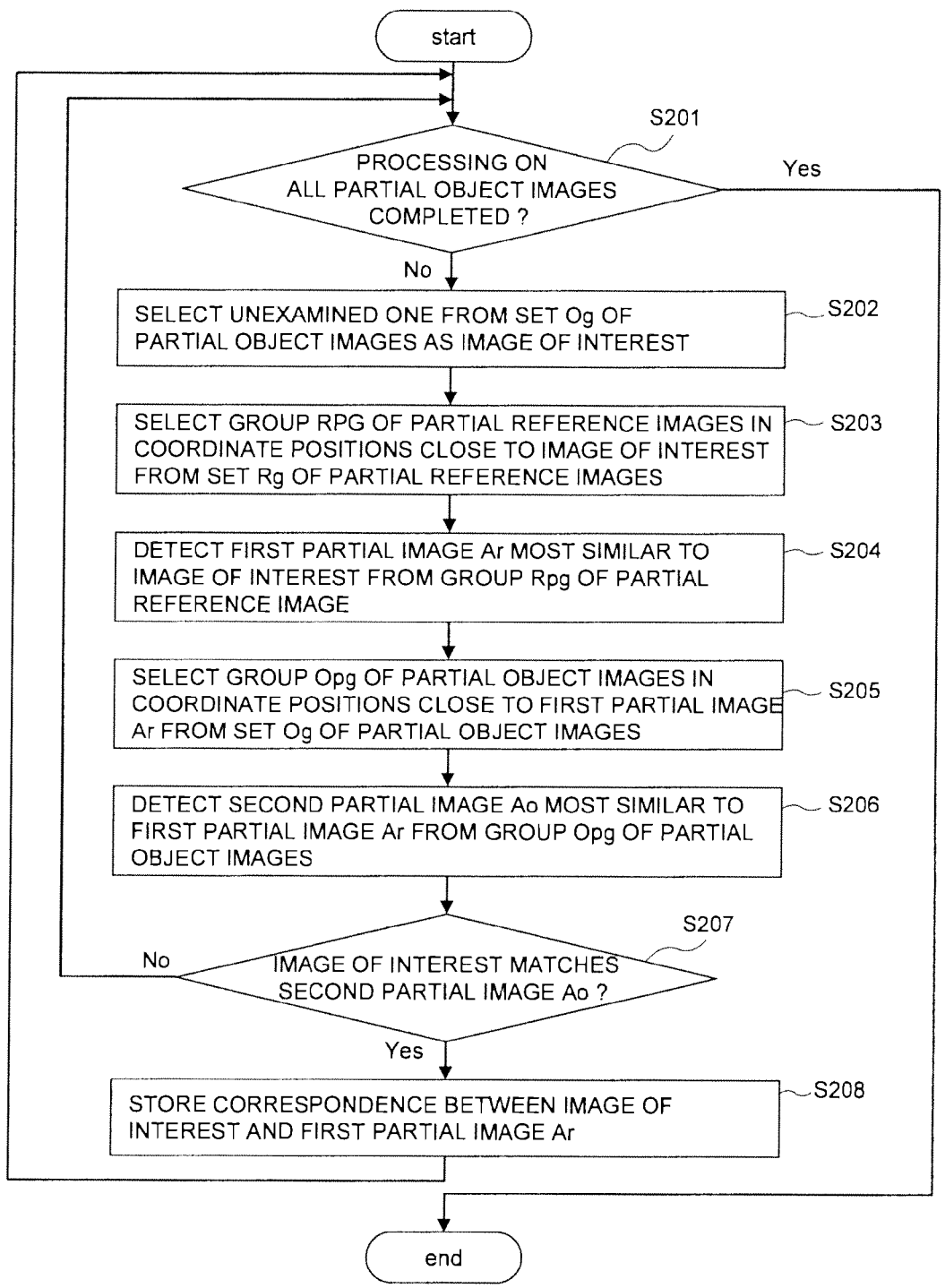
FIG. 3 is a flowchart illustrating a specific exemplary procedure of determination processing.

A configuration and operation of image matching device 300 will be described below with reference to FIGS. 2 and 3. FIG. 2 is a flowchart schematically illustrating a process procedure performed by image matching device 300. FIG. 3 is a flowchart schematically illustrating a procedure of determination processing (step S108 of FIG. 2) performed by determination processing section 305.

Image-to-be-matched extracting section 301 includes first image extracting section 301A, second image extracting section 301B, and normalizing section 302. First image extracting section 301A extracts a first object region image from an input image captured by and transferred from image pickup section 101 and provides the first object region image to normalizing section 302 (step S101). Second image extracting section 301B extracts a second object region image from an input image read and transferred from image storage 201 (the image is a registered image registered previously in image storage 201) and provides the second object region image to normalizing section 302 (step S102). First image extracting section 301A and second image extracting section 301B may extract the first and second object region images, respectively, on the basis of a global structural feature, a color region or the contour shape in the input images.

The input images transferred to image matching device 300 are two-dimensional images in each of which pixel values are arranged in a two-dimensional array. The pixel values are not limited to any specific value but may be any value in any color space. For example, the pixel value may be a value in an RGB color space or may be a luminance value (Y) or a color-difference value (Cb, Cr) in a YCbCr color space.

Normalizing section 302 performs at least one operation from among: position adjustment, rotation and scaling of a subject image in a first object region image on the bases of a global structural feature (for example a feature such as the eyes, nose, and ears of a living individual) in the first object region image to normalize the first object region image to generate an object image SO (step S103). At the same time, normalizing section 302 performs at least one operation from among: position adjustment, rotation and scaling of a subject image in a second object region image on the basis of a global structural feature (for example a feature such as the eyes, nose, and ears of a living individual) in the second object region image to normalize the second object region image to generate a reference image SR (step S103). When an object to be examined is a facial image or a fingerprint image, the center of the eyes, eyebrows, nostrils, mouth, or facial contour, or a whorl of the fingerprint may be used as a global structural feature. When an object to be examined is an artifact, the shape of the artifact such as a cube or rectangle, or a feature of a logo may be used as a global structural feature.

Feature quantity calculating section 303 includes first feature quantity calculating section 303A and second feature quantity calculating section 303B. Region extracting section 304 includes first region extracting section 304A and second region extracting section 304B. First feature quantity calculating section 303A calculates local structural feature quantities relating to the object image SO (step S104); second feature quantity calculating section 303B calculates local structural feature quantities relating to the reference image SR (step S105). A method for calculating the structural feature quantities will be described later.

First feature quantity calculating section 303A and first region extracting section 304A cooperate to extract partial object images PO1 to PON (where N is an integer greater than or equal to 2) containing local structural features (for example moles, flecks, freckles, pores or pimples and pits that appear in facial skin) from the object image SO provided from normalizing section 302 (step S106). Here, each of partial object images PO1 to PON extracted may be a sub-region that is set based on one point representing a local structural feature in the object image SO. For example, a sub-region (for example, a circular or polygonal region) centered at a point representing a local structural feature can be extracted as a partial object image. Local coordinate positions, which will be described later, can be set in each of partial object images PO1 to PON.

On the other hand, second feature quantity calculating section 303B and second region extracting section 304B cooperate to extract partial reference images PR1 to PRM (where M is an integer greater than or equal to 2) containing local structural features (for example moles, flecks, freckles, pores or pimples and pits of the skin that appear in facial skin) from the reference image SR provided from normalizing section 302 (step S107). Feature quantity calculating section 303 and region extracting section 304 can constitute a feature image extracting section according to the present invention. Like partial object images PO1 to PON, each of partial reference images PR1 to PRM extracted may be a sub-region that is set based on a point representing a local structural feature in reference image SR. For example, a sub-region (for example, a circular or polygonal region) centered at a point representing a local structural feature can be extracted as a partial reference image. Local coordinate positions, which will be described later, can be set in each of partial reference images PR1 to PRM.

The number of partial object images PO1 to PON is not always greater than or equal to 2; it can be 0 or 1. Likewise, the number of partial reference images PR1 to PRM is not always greater than or equal to 2; it can be 0 or 1. The process for extracting partial object images PO1 to PON from an object image SO and the process for extracting partial reference images PR1 to PRM from a reference image SR are collectively referred to as the feature image extracting process.

The process from step S104 through step S107 will be described in further detail. First feature quantity calculating section 303A sets each pixel in the object image SO as a pixel of interest P1 $(p, q)$. First feature quantity calculating section 303A then determines a first approximate plane, which is a function z1 approximately representing a set of pixel values f1 $(x, y)$ in a local region $\Delta S1$ containing the pixel of interest P1 $(p, q)$. Here, x and y are variables indicating the coordinate position of a pixel value in local region $\Delta S1$. First feature quantity calculating section 303A calculates a value proportional to the difference $\Delta 1$ $(p, q)$ between pixel value f1 $(p, q)$ in object image SO and corresponding value z1 $(p, q)$ in the first approximate plane $(\Delta 1(p, q)=f1 (p, q)-z1 (p, q))$ as a structural feature quantity g1 $(p, q)$ relating to the object image SO (step S104). Structural feature quantities g1 $(p, q)$ are calculated for all pixels in the object image SO.

The array of structural feature quantities g1 $(p, q)$ includes image information in which a local structural feature is enhanced. First region extracting section 304A can extract regions representing the local structural feature from the array of structural feature quantities g1 $(p, q)$ as partial object images PO1 to PON (step S106).

Here, in order to compensate for shifts of pixel values due to external factors, it is desirable that the structural feature quantities g1 $(p, q)$ be difference $\Delta 1$ $(p, q)$ divided by statistical error s1 in the difference (g1 $(p, q)=\Delta 1/s1$). The statistical error may be the standard deviation, for example.

On the other hand, second feature quantity calculating section 303B sets each pixel in reference image SR as a pixel of interest P2 $(p, q)$ and determines a second approximate plane which is a function z2 approximately representing a set of pixel values f2 $(x, y)$ in a local region $\Delta S2$ containing the pixel of interest P2 $(p, q)$. Second feature quantity calculating section 303B calculates a value proportional to the difference $\Delta 2(p, q)$ between a pixel value f2 $(p, q)$ in the reference image SR and corresponding value z2 $(p, q)$ in the second approximate plane $(\Delta 2(p, q)=f2 (p, q)-z2 (p, q))$ as a structural feature quantity g2 $(p, q)$ relating to the reference image SR (step S105). Structural feature quantities g2 $(p, q)$ are calculated for all pixels in the reference image SR.

The array of structural feature quantities g2 $(p, q)$ includes image information in which a local structural feature is enhanced. Second region extracting section 304B can extract regions representing the local structural feature from the array of structural feature quantities g2 (p, q) as partial reference images PR1 to PRM (step S107).

In order to compensate for shifts of pixel values due to external factors, it is desirable that the structural feature quantities g2 $(p, q)$ be difference $\Delta 2(p, q)$ divided by statistical error s2 in the difference (g2 $(p, q)=\Delta 2/s2$). The statistical error may be the standard deviation, for example.

The first and second approximate planes can be obtained by using multiple regression analysis. Here, let f (x, y) denote a pixel value f1 $(x, y)$ in an object image SO or a pixel value f2 $(x, y)$ in a reference image SR. The function representing the first or second approximate plane is a linear function of variables x and y: z (x, y)=ax+by+c. Parameters a, b and c of the function can be determined as follows: the difference between each function value z (x, y) and pixel value f (x, y) is squared and parameters a, b and c that result in the smallest sum of the squares for all x and y in local region $\Delta S1$ or $\Delta S2$ are obtained.

Structural feature quantity g (p, q) can be calculated according to Equation (1) given below.

[expression 1]

$$g(p, q) = \frac{f(p, q) - z(p, q)}{s} \quad (1)$$

Here, structural feature quantity g (p, q) represents g1 $(p, q)$ or g2 $(p, q)$ described above; s is the standard deviation of differences $\Delta 1(x, y)$ in local region $\Delta S1$ or the standard deviation of differences $\Delta 2(x, y)$ in local region $\Delta S2$.

A point representing a local structural feature can be a point with a locally low structural feature quantity. For example, for each pixel of interest in an image consisting of an array of structural feature quantities, the difference between the smallest structural feature quantity on the circumference of a circle centered at the pixel of interest with a certain radius and the structural feature quantity of the pixel of interest may be calculated. A pixel of interest that satisfies the condition in which the difference is greater than or equal to a threshold may be extracted as a feature point. With this, in facial image matching, a mole, freckle or pore on skin texture, for example, can be extracted as a feature point.

Determination processing section 305 uses first image detecting section 306 and second image detecting section 307 to perform determination processing (step S108). Specifically, first image detecting section 306 sets each of partial object images PO1 to PON as an image of interest and detects first partial image Ar that is most similar to the image of interest from a set Rg of partial reference images PR1 to PRM described above (the processing is referred to as "first image detecting processing"). Then, second image detecting section 307 detects second partial image Ao that is most similar to first partial image Ar from a set Og of partial object images PO1 to PON (the processing is referred to as "second image detecting processing"). Determination processing section 305 determines whether or not the image of interest matches second partial image Ao and outputs the result of the determination to image matching section 308 (the processing is referred to as "determination processing"). If determination processing section 305 determines that the image of interest matches second partial image Ao, determination processing section 305 records the correspondence relationship between first partial image Ar most similar to second partial image Ao and the image of interest in image correspondence table 202 (the processing is referred to as "recording processing").

The first image detecting processing, the second image detecting processing, the determination processing, and the recording processing are performed on all partial object images PO1 to PON.

FIG. 3 is a flowchart illustrating an example of a more specific procedure of the determination processing. First, determination processing section 305 skips step S201 and selects one unexamined partial image from set Og of partial object images PO1 to PON as an image of interest (step S202). Then, first image detecting section 306 selects a group Rpg (subset) of partial reference images that are in coordinate positions close to the image of interest from set Rg of partial reference images PR1 to PRM (step S203). First image detecting section 306 also detects first partial image Ar in partial reference image group Rpg that is most similar to the image of interest (step S204).

Then, second image detecting section 307 selects group Opg of partial object images that are in coordinate positions close to first partial image Ar from set Og of partial object images PO1 to PON (step S205). Second image detecting section 307 then detects second partial image Ao that is most similar to first partial image Ar from partial object image group Opg (step S206).

Determination processing section 305 determines whether or not the image of interest matches second partial image Ao and outputs the result of the determination to image matching section 308 (step S207). If determination processing section 305 determines that the image of interest does not match second partial image Ao (NO at step S207), determination processing section 305 returns to step S201 and determines whether all partial object images PO1 to PON have been subjected to the matching processing (step S201). If determination processing section 305 determines that not all partial object images PO1 to PON have been subjected to the matching processing (NO at step S201), determination processing section 305 proceeds to step S202; if determination processing section 305 determines that all partial object images PO1 to PON have been subjected to the matching processing (YES at step S201), determination processing section 305 ends the process.

On the other hand, if determination processing section 305 determines that the image of interest matches second partial image Ao (YES at step S207), determination processing section 305 records the correspondence relationship between first partial image Ar that is most similar to second partial image Ao and the image of interest in image correspondence table 202 (step S208). Determination processing section 305 then returns to step S201.

First image detecting section 306 can calculate a value representing statistical correlation between the distribution of pixel values of an image of interest and the distribution of pixel values of each of partial reference images PR1 to PRM and can use the values as a measure of the similarity between the image of interest and each of partial reference images PR1 to PRM. Similarly, second image detecting section 307 can use a value representing statistical correlation between the distribution of pixel values of first partial image Ar and the distribution of pixel values of each of partial object images PO1 to PON as a measure of the similarity between first partial image Ar and each of partial object images PO1 to PON. The value representing statistical correlation may be a correlation coefficient.

Let s (i, j) denote the measure of similarity between the i-th partial object image POi and the j-th partial reference image PRj. At step S204 (see FIG. 3) described above, partial reference image PRJ (where J is any number in the range of 1 to M) that is most similar to partial object image POi that is an image of interest can be detected according to Equation (2) given below.

[expression 2]

$$J = \underset{j \in A_1}{\operatorname{argmax}} s(i, j) \quad (2)$$

The equation provides the number j (=J) of partial reference image PRj that results in the largest value of the measure of similarity s (i, j). Here, A1 is a set of the numbers j of the partial reference images that belong to partial reference image group Rpg.

If the measure of similarity s (i, j) is the correlation coefficient, the measure of similarity s (i, j) can be expressed by Equation (3) given below.

[expression 3]

$$s(i, j) = \frac{\sum_{a,b}(g_i(a, b) - \langle g_i \rangle)(g_j(a, b) - \langle g_j \rangle)}{\sqrt{\sum_{a,b}(g_i(a, b) - \langle g_i \rangle)^2 \sum_{a,b}(g_j(a, b) - \langle g_j \rangle)^2}} \quad (3)$$

Here a and b represent a local coordinate position set in the partial object image or the partial reference image, gi (a, b) is the structural feature quantity in the local coordinate position (a, b) in partial object image POi, gj (a, b) is the structural feature quantity in the local coordinate position (a, b) in partial reference image PRj, <gi> is the average of the structural feature quantities gi (a, b) in the partial object image POi, and <gj> is the average of the structural feature quantities gj (a, b) in partial reference image PRj.

Alternatively, first image detecting section 306 may calculate the measure of similarity (i, j) as follows. First image detecting section 306 calculates the noun (distance) $\|p1(m)-p2(n)\|$ between a point $p1(m)$ representing a local structural feature contained in the image of interest POi and a point $p2(n)$ representing the local structural feature contained in each partial reference image PRj. First image detecting section 306 can then calculate the number of combinations (p1 $(m)$, $p2(n)$) of points the calculated distance between which is less than or equal to a predetermined threshold as the measure of similarity s (i, j) between the image of interest POi and each partial reference image PRj. Here, point $p1(m)$ is a position vector (ai, bi) representing a local coordinate position in image of interest POi and point $p2(n)$ is a position vector (aj, bj) representing a local coordinate position in partial reference image PRj.

Here, the measure of similarity s (i, j) can be given by Equation (4) given below.

[expression 4]

$$s(i, j) = \sum_{m \in B_i} \sum_{n \in B_j} L(m, n) \quad (4)$$

where, Bi is a set of the numbers m of points $p1(m)$ representing a local structural feature contained in the image of interest POi and Bj is a set of the numbers n of points $p2(n)$ representing the local structural feature contained in the partial reference image PRj.

First image detecting section 306 can calculate L (m, n) according to Equation (5) given below.

[expression 5]

$$L(m, n) = \begin{cases} 1 & \text{if } \|p_1(m) - p_2(n)\| < \text{threshold} \\ 0 & \text{otherwise} \end{cases} \quad (5)$$

When the norm $\|p1(m)-p2(n)\|$ between point $p1(m)$ and point $p2(n)$ is less than or equal to the threshold, the equation yields the value L(m, n) of "1"; otherwise, the equation yields the value of 0.

Like first image detecting section 306, second image detecting section 307 can perform the following process. Second image detecting section 307 calculates the distance between a point representing a local structural feature contained in first partial image Ar and a point representing the local structural feature contained in each partial object image. Second image detecting section 307 can use the number of combinations of points the calculated distance between which is less than or equal to a predetermined threshold as the measure of similarity between first partial image Ar and each partial object image.

The measure of similarity s (i, j) may be the similarity value obtained according to Equation (3) multiplied by the similarity value obtained according to Equation (4), for example.

At step S206 (see FIG. 3) described above, second partial image Ao (=POK) that is most similar to first partial image Ar (=PRJ) can be found according to Equation (6) given below.

[expression 6]

$$K = \underset{k \in A_2}{\arg\max}\, s(k, j) \quad (6)$$

Here, A2 is a set of the numbers k of partial object images that belong to partial object image group Opg.

After completion of the determination processing (step S108 of FIG. 2) described above, image matching section 308 sums the values of the measure of similarity s (i, j) between partial object images POi and partial reference images PRj that have a correspondence relationship recorded in image correspondence table 202. Image matching section 308 outputs the sum S as the degree of matching (matching score) (step S109). The sum S can be calculated according to Equation (7) given below.

[expression 7]

$$S = \sum_{(i,j) \in C} s(i, j) \quad (7)$$

Here, set C consists of combinations (i, j) of partial object images POi and partial reference images PRj that have a correspondence relationship recorded in image correspondence table 202.

Figure 4:
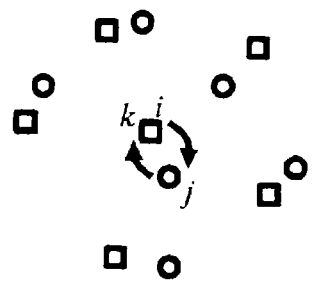
FIG. 4 is a diagram illustrating a feature space for explaining image matching.
Figure 5:
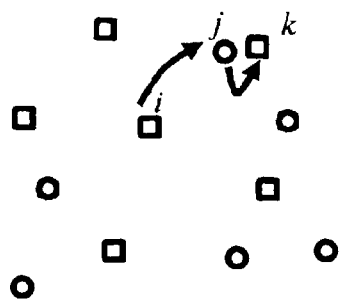
FIG. 5 is a diagram illustrating a feature space for explaining image matching.

FIGS. 4 and 5 are diagrams illustrating feature spaces for explaining the image matching described above. In the feature spaces depicted in the Figs, circles represent feature quantities of images that belong to a set Rg of partial reference images; squares represent feature quantities of images that belong to a set Og of partial object images. As depicted in FIG. 4, if the i-th partial object image POi matches the j-th partial reference image PRj, the difference between partial object image POi and detected first partial image PRj is small. Consequently, second partial image POk that matches image of interest POi (that is, i=k) is likely to be detected at step S207 (see FIG. 3).

On the other hand, as depicted in FIG. 5, if a partial object image and a partial reference image do not match, the difference between partial object image POi and detected first partial image PRj is large since there is no partial reference image that matches the image of interest POi. Consequently, second partial image POk that does not match image of interest POi is likely to be detected.

As has been described above, image matching device 300 of the present exemplary embodiment is capable of matching an object image against a reference image with a high accuracy even if the position, shape or luminance of a local structural feature varies due to external factors. Since objects to be matched are in effect limited to partial object images PO1 to PON containing a local structural feature and partial reference images PR1 to PRM containing the local structural feature, the matching processing can be performed with a relatively small amount of computation.

Figure 6:
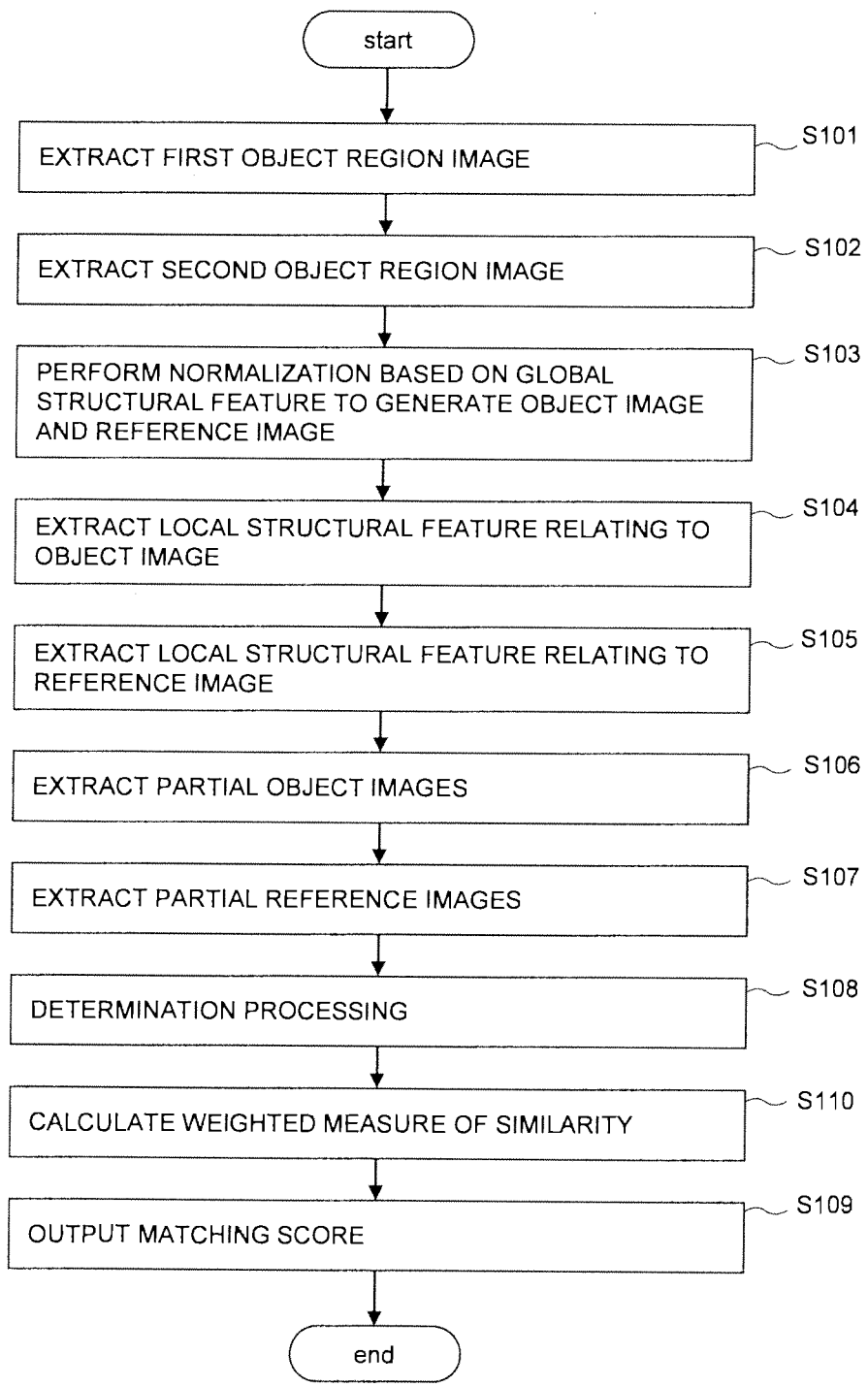
FIG. 6 is a flowchart schematically illustrating a process procedure performed by an image matching device according to a variation of the exemplary embodiment.

A variation of the exemplary embodiment described above will be described below. FIG. 6 is a flowchart schematically illustrating a process procedure performed by image matching device 300 according to the variation. The flowchart of FIG. 6 is the same as the flowchart of FIG. 2, except that step S110 is provided between steps S108 and S109 in the flowchart of FIG. 6.

At step S110, image matching section 308 assigns an appropriate weighting factor w (i, j) to the value of the measure of similarity s (i, j) between each partial object image and a partial reference image that have a correspondence relationship recorded in image correspondence table 202. Image matching section 308 sums the weighted values of the measure of similarity w (i, j) s (i, j) and outputs the sum S as the degree of matching (matching score) (step S109).

Weighting factor w (i, j) is the number of combinations of points p1($m$) representing a local structural feature contained in each partial object image and points p2($n$) representing the local structural feature contained in each partial reference image that satisfy the following two conditions at the same time. One is that the distance between point p1($m$) and p2($n$) is less than a predetermined threshold; the other is that the combination of the points have a correspondence relationship recorded in image correspondence table 202. The weighting factor w (i, j) can be expressed by Equation (8) given below.

[expression 8]

$$w(i, j) = \sum_{m \in D_i} \sum_{n \in D_j} L(m, n) \quad (8)$$

Here, L (m, n) can be calculated according to Equation (9) given below.

[expression 9]

$$L(m, n) = \begin{cases} 1 & \text{if } \|p_1(m) - p_2(n)\| < \text{threshold and } (m, n) \in C \\ 0 & \text{otherwise} \end{cases} \quad (9)$$

Therefore, matching score S can be calculated according to Equation (10) given below.

[expression 10]

$$S = \sum_{(i,j) \in C} w(i, j) s(i, j) \quad (10)$$

According to the variation, the feature points contained in set Di and set Dj in Equation (8) correspond to the combinations of partial images determined by determination processing section 305 to be in a stable correspondence with each other. Therefore, the influence of unstably-extracted feature points and features points that are in an unstable correspondence with each other can be eliminated. Accordingly, matching with higher accuracy can be achieved.

While exemplary embodiments of the present invention have been described with reference to the drawings, the exemplary embodiments are illustrative of the present invention. Various other configurations may be employed. For example, while first image extracting section 301A and second image extracting section 301B are separate functional blocks in the exemplary embodiments, these functional blocks may be replaced with a single image extracting section that alternately generates a first object region image and a second object region image. Likewise, first and second feature quantity calculating sections 303A and 303B and first and second region extracting sections 304A and 304B may also be replaced with such combined arrangements.

The image matching device of any of the exemplary embodiments described above can be used in applications such as an image search device that searches an image of a particular person from a group of images, in addition to the application to a personal verification device using biometric information.

An example of the advantageous effects of the present invention will be described below. In the image matching device, image matching method, and image matching program according to the present invention, one or more partial object images containing a local structural feature are extracted from an object image and one or more partial reference images containing the local structural feature are extracted from each reference image. Each of the partial object images is set as an image of interest and a first partial image that is most similar to the image of interest is detected from the set of partial reference images and a second partial image that is most similar to the first partial image is detected from the set of partial object images. Since the image matching device, the image matching method, and the image matching program determine whether or not the image of interest matches the second partial image, the result of the determination can be used to find a partial reference image that matches the partial object image without inconsistency. Therefore, matching an object image and a reference image can be accomplished with a high accuracy even if the position, shape or luminance of local structural feature varies due to external factors.

Since images to be matched are in effect limited to partial object images containing a local structural feature and partial reference images containing the local structural feature, the matching processing can be performed with a relatively small amount of computation.

While the present invention has been described with respect to exemplary embodiments thereof, the present invention is not limited to the exemplary embodiments described above. Various modifications which may occur to those skilled in the art can be made to the configurations and details of the present invention without departing from the scope of the present invention.

The invention claimed is:

1. An image matching device which matches an object image against one or more reference images, comprising:
    a feature image extracting section configured to extract a plurality of partial object images containing a local structural feature from the object image and to extract a plurality of partial reference images containing a local structural feature from each of the reference images;
    a first image detecting section configured to set each of the plurality of partial object images as an image of interest and to detect a first partial image most similar to the image of interest from a set including the plurality of partial reference images;
    a second image detecting section configured to detect a second partial image most similar to the first partial image from a set including the plurality of partial object images;
    a determination processing section configured to determine whether or not each image of interest in a plurality of images of interest matches the second partial image which corresponds to the image of interest and to output the result of the determination; and
    an image matching section configured to calculate a degree of matching between the object image and each of the reference images on the basis of the results of determination provided from the determination processing section for all of the plurality of partial object images.

2. The image matching device according to claim 1, wherein:
the object image comprises a two-dimensional array of pixel values;
the reference image comprises a two-dimensional array of pixel values;
the feature image extracting section comprises:
a feature quantity calculating section setting each pixel of the object image as a pixel of interest, determining a first approximate plane which is a function approximately representing a set of pixel values in a local region containing the pixel of interest, and calculating a value proportional to a first difference between a pixel value in the local region and a value in the first approximate plane that corresponds to the pixel value as a structural feature quantity relating to the object image; and
a region extracting section extracting a region representing the local structural feature from an array of structural feature quantities relating to the object image as the partial object image, wherein
the feature quantity calculating section sets each pixel of the reference image as a pixel of interest, determines a second approximate plane which is a function approximately representing a set of pixel values in a local region containing the pixel of interest, and calculates a value proportional to a second difference between a pixel value in the local region and a value in the second approximate plane that corresponds to the pixel value as a structural feature quantity relating to the reference image; and
the region extracting section extracts a region representing the local structural feature as the partial reference image from the array of the structural feature quantities relating to the reference image.

3. The image matching device according to claim 2, wherein:
the feature quantity calculating section calculates a statistical error in the first difference relating to all pixel values in the local region for each pixel of the object image and divides the first difference by the statistical error in the first difference to obtain a structural feature quantity relating to the object image, and calculates a statistical error in the second difference relating to all pixel values in the local region for each pixel of the reference image and divides the second difference by the statistical error in the second difference to calculate a structural feature quantity relating to the reference image.

4. The image matching device according to claim 1, wherein:
the first image detecting section is configured to calculate a value representing a statistical correlation between the distribution of pixel values in the image of interest and the distribution of pixel values in the partial reference image as a measure of similarity between the image of interest and the partial reference image; and
the second image detecting section is configured to use the value representing the statistical correlation between the distribution of pixel values in the first partial image and the distribution of pixel values in the partial object image as a measure of similarity between the first partial image and the partial object image.

5. The image matching device according to claim 4, wherein:
the determination processing section is configured to record a correspondence relationship between the image of interest and a first partial image most similar to the second partial image in an image correspondence table when the determination processing section determines that the image of interest matches the second partial image; and
the image matching section is configured to sum the values of the measure of similarity between the partial object images and the partial reference images that have a correspondence relationship recorded in the image correspondence table and to output the sum as the degree of matching.

6. The image matching device according to claim 1, wherein:
the first image detecting section calculates the distance between a first point representing the local structural feature contained in the image of interest and a second point representing the local structural feature contained in each of the partial reference images and calculates the number of combinations of the first and second points the calculated distance between which is less than or equal to a predetermined threshold as the measure of similarity between the image of interest and each of the partial reference image; and
the second image detecting section calculates the distance between a third point representing the local structural feature contained in the first partial image and a fourth point representing the local structural feature contained in each of the partial object images and uses the number of combinations of the third and fourth points the calculated distance between which is less than or equal to a predetermined threshold as the measure of similarity between the first partial image and each of the partial object images.

7. The image matching device according to claim 6, wherein: the determination processing section records a correspondence relationship between the image of interest and a first partial image most similar to the second partial image in an image correspondence table when the determination processing section determines that the image of interest matches the second partial image; and the image matching section sums the values of the measure of similarity between the partial object images and the partial reference images that have a correspondence relationship recorded in the image correspondence table and outputs the sum as the degree of matching.

8. The image matching device according to claim 4, wherein:
the determination processing section is configured to record a correspondence relationship between the image of interest and a first partial image most similar to the second partial image in an image correspondence table when the determination processing section determines that the image of interest matches the second partial image;
the image matching section is configured to assign an appropriate weighting factor to each value of the measure of similarity between the partial object images and the partial reference images that have a correspondence relationship recorded in the image correspondence table, to sum the weighted values of the measure of similarity, and to output the sum as the degree of matching; and
the weighting factor satisfies a condition in which the distance between a first point representing the local structural feature contained in each of the partial object images and a second point representing the local structural feature contained in each of the partial reference images is less than or equal to a predetermined threshold and is the number of combinations of the first and second points that have a correspondence relationship recorded in the image correspondence table.

9. The image matching device according to claim 1, wherein the local structural feature is at least one feature selected from the group consisting of a mole, fleck, freckle, pore and skin irregularity that appears in facial skin.

10. The image matching device according to claim 1, further comprising an image-to-be-matched extracting section extracting a first object region image from an input image and performing at least one operation from among: position adjustment, rotation and scaling of a subject image in the first object region image on the basis of a global structural feature of the first object region image to generate the object image, wherein
the image-to-be-matched extracting section extracts a second object region image from a registered image and performs at least one operation from among: position adjustment, rotation and scaling of a subject image in the second object region image on the basis of a global structural feature of the second object region image to generate the reference image.

11. The image matching device according to claim 10, wherein the global structural feature is a feature that appears in facial skin.

12. An image matching method for matching an object image against one or more reference images, comprising:
performing a feature image extracting step of extracting a plurality of partial object images containing a local structural feature from the object image and extracting a plurality of partial reference images containing a local structural feature from each of the reference images;
performing a first image detecting step of setting each of the plurality of partial object images as an image of interest and detecting a first partial image most similar to the image of interest from a set including the plurality of partial reference images;
performing a second image detecting step of detecting a second partial image most similar to the first partial image from a set including the plurality of partial object images; and
performing a determination processing step of determining whether or not each image of interest in a plurality of images of interest matches the second partial image which corresponds to the image of interest and outputting the result of the determination; and
performing an image matching step of calculating a degree of matching between the object image and each of the reference images on the basis of the results of determination for all of the plurality of partial object images.

13. The image matching method according to claim 12, wherein:
the object image comprises a two-dimensional array of pixel values and the reference image comprises a two-dimensional array of pixel values; and
the feature image extracting step comprises the steps of:
setting each pixel of the object image as a pixel of interest, determining a first approximate plane which is a function for approximately representing a set of pixel values in a local region containing the pixel of interest, and calculating a value proportional to a first difference between a pixel value in the local region and a value in the first approximate plane that corresponds to the pixel value as a structural feature quantity relating to the object image;
extracting a region representing the local structural feature from an array of structural feature quantities relating to the object image as the partial object image;
setting each pixel of the reference image as a pixel of interest, determining a second approximate plane which is a function for approximately representing a set of pixel values in a local region containing the pixel of interest, and calculating a value proportional to a second difference between a pixel value in the local region and a value in the second approximate plane that corresponds to the pixel value as a structural feature quantity relating to the reference image; and
extracting a region representing the local structural feature as the partial reference image from the array of the structural feature quantities relating to the reference image.

14. The image matching method according to claim 13, wherein:
a structural feature quantity relating to the object image is calculated by calculating a statistical error in the first difference relating to all pixel values in the local region for each pixel of the object image and dividing the first difference by the statistical error in the first difference; and
a structural feature quantity relating to the reference image is calculated by calculating a statistical error in the second difference relating to all pixel values in the local region for each pixel of the reference image and dividing the second difference by the statistical error in the second difference.

15. The image matching method according to claim 12, wherein:
the first image detecting step comprises the step of calculating a value representing a statistical correlation between the distribution of pixel values in the image of interest and the distribution of pixel values in the partial reference image as a measure of similarity between the image of interest and the partial reference image; and
the second image detecting step comprises the step of using the value representing the statistical correlation between the distribution of pixel values in the first partial image and the distribution of pixel values in the partial object image as a measure of similarity between the first partial image and the partial object image.

16. The image matching method according to claim 15, further comprising:
when it is determined in the determination processing step that the image of interest matches the second partial image, recording a correspondence relationship between the image of interest and a first partial image most similar to the second partial image in an image correspondence table; and
when the determination results for all of the plurality of partial object images are given, summing the values of the measure of similarity between the partial object images and the partial reference images that have a correspondence relationship recorded in the image correspondence table and outputting the sum as the degree of matching between the object image and each of the reference images.

17. The image matching method according to claim 12, wherein:
the first image detecting step comprises the steps of calculating the distance between a first point representing the local structural feature contained in the image of interest and a second point representing the local structural feature contained in each of the partial reference images and calculating the number of combinations of the first and second points the calculated distance between which is less than or equal to a predetermined threshold as the measure of similarity between the image of interest and each of the partial reference images; and the second image detecting step comprises the steps of calculating the distance between a third point representing the local structural feature contained in the first partial image and a fourth point representing the local structural feature contained in each of the partial object images and using the number of combinations of the third and fourth points the calculated distance between which is less than or equal to a predetermined threshold as the measure of similarity between the first partial image and each of the partial object images.

18. The image matching method according to claim 17, further comprising:

when it is determined in the determination processing step that the image of interest matches the second partial image, recording a correspondence relationship between the image of interest and a first partial image most similar to the second partial image in an image correspondence table; and when the determination results for all of the partial object images are given, summing the values of the measure of similarity between the partial object images and the partial reference images that have a correspondence relationship recorded in the image correspondence table and outputting the sum as the degree of matching.

19. The image matching method according to claim 15, further comprising:

when it is determined in the determination processing step that the image of interest matches the second partial image, recording a correspondence relationship between the image of interest and a first partial image most similar to the second partial image in the image correspondence table; and when the determination results for all of the plurality of partial object images are given, assigning an appropriate weighting factor to each value of the measure of similarity between the partial object images and the partial reference images that have a correspondence relationship recorded in the image correspondence table, summing the weighted values of the measure of similarity, and outputting the sum as the degree of matching;

wherein the weighting factor satisfies a condition in which the distance between a first point representing the local structural feature contained in each of the plurality of partial object images and a second point representing the local structural feature contained in each of the plurality of partial reference images is less than or equal to a predetermined threshold and is the number of combinations of the first and second points that have a correspondence relationship recorded in the image correspondence table.

20. The image matching method according to claim 12, wherein the local structural feature is at least one feature selected from the group consisting of a mole, fleck, freckle, pore and skin irregularity that appears in facial skin.

21. The image matching method according to claim 12, further comprising:

extracting a first object region image from an input image and performing at least one operation from among: position adjustment, rotation and scaling of a subject image in the first object region image on the basis of a global structural feature of the first object region image to generate the object image; and extracting a second object region image from a registered image and performing at least one operation from among: position adjustment, rotation and scaling of a subject image in the second object region image on the basis of a global structural feature of the second object region image to generate the reference image.

22. The image matching method according to claim 21, wherein the global structural feature is a feature that appears in facial skin.

23. An image matching program product causing a computer to execute a process for matching an object image against one or more reference images, the process comprising:

a feature image extracting step of extracting a plurality of partial object images containing a local structural feature from the object image and extracting a plurality of partial reference images containing a local structural feature from each of the reference images;

a first image detecting step of setting each of the plurality of partial object images as an image of interest and detecting a first partial image most similar to the image of interest from a set including the plurality of partial reference images;

a second image detecting step of detecting a second partial image most similar to the first partial image from a set including the plurality of partial object images;

a determination processing step of determining whether or not each image of interest in a plurality of images of interest matches the second partial image which corresponds to the image of interest and outputting the result of the determination; and an image matching step of calculating a degree of matching between the object image and each of the reference images on the basis of the results of determination for all of the plurality partial object images.

24. The image matching program product according to claim 23, wherein:

the object image comprises a two-dimensional array of pixel values and the reference image comprises a two-dimensional array of pixel values; and the feature image extracting step comprises:

a first feature quantity calculating step of setting each pixel of the object image as a pixel of interest, determining a first approximate plane which is a function for approximately representing a set of pixel values in a local region containing the pixel of interest, and calculating a value proportional to a first difference between a pixel value in the local region and a value in the first approximate plane that corresponds to the pixel value as a structural feature quantity relating to the object image;

a second region extracting step of extracting a region representing the local structural feature from an array of structural feature quantities relating to the object image as the partial object image;

a second feature quantity calculating step of setting each pixel of the reference image as a pixel of interest, determining a second approximate plane which is a function for approximately representing a set of pixel values in a local region containing the pixel of interest, and calculating a value proportional to a second difference between a pixel value in the reference image and a value in the second approximate plane that corresponds to the pixel value as a structural feature quantity relating to the reference image; and a second region extracting step of extracting a region representing the local structural feature as the partial reference image from the array of the structural feature quantities relating to the reference image.

25. The image matching program product according to claim 24, wherein:
a structural feature quantity relating to the object image is calculated by calculating a statistical error in the first difference relating to all pixel values in the local region for each pixel of the object image and dividing the first difference by the statistical error in the first difference; and
a structural feature quantity relating to the reference image is calculated by calculating a statistical error in the second difference relating to all pixel values in the local region for each pixel of the reference image and dividing the second difference by the statistical error in the second difference.

26. The image matching program product according to claim 23, wherein:
the first image detecting step comprises the step of calculating a value representing a statistical correlation between the distribution of pixel values in the image of interest and the distribution of pixel values in the partial reference image as a measure of similarity between the image of interest and the partial reference image; and
the second image detecting step comprises the step of using the value representing the statistical correlation between the distribution of pixel values in the first partial image and the distribution of pixel values in the partial object image as a measure of similarity between the first partial image and the partial object image.

27. The image matching program product according to claim 26, further comprising the steps of:
when it is determined by the determination processing step that the image of interest matches the second partial image, recording a correspondence relationship between the image of interest and a first partial image most similar to the second partial image in an image correspondence table; and
when the determination results for all of the plurality of partial object images are given, summing the values of the measure of similarity between the partial object images and the partial reference images that have a correspondence relationship recorded in the image correspondence table and outputting the sum as the degree of matching between the object image and each of the reference images.

28. The image matching program product according to claim 23, wherein:
the first image detecting step comprises the steps of calculating the distance between a first point representing the local structural feature contained in the image of interest and a second point representing the local structural feature contained in each of the partial reference images and calculating the number of combinations of the first and second points the calculated distance between which is less than or equal to a predetermined threshold as the measure of similarity between the image of interest and each of the partial reference image; and
the second image detecting step comprises the steps of calculating the distance between a third point representing the local structural feature contained in the first partial image and a fourth point representing the local structural feature contained in each of the partial object images and using the number of combinations of the third and fourth points the calculated distance between which is less than or equal to a predetermined threshold as the measure of similarity between the first partial image and each of the partial object images.

29. The image matching program product according to claim 28, further comprising the steps of:
when it is determined by the determination processing step that the image of interest matches the second partial image, recording a correspondence relationship between the image of interest and a first partial image most similar to the second partial image in an image correspondence table; and
when the determination results for all of the partial object images are given, summing the values of the measure of similarity between the partial object images and the partial reference images that have a correspondence relationship recorded in the image correspondence table and outputting the sum as the degree of matching.

30. The image matching program product according to claim 26, further comprising the steps of:
when it is determined in the determination processing step that the image of interest matches the second partial image, recording a correspondence relationship between the image of interest and a first partial image most similar to the second partial image in the image correspondence table; and
when the determination results for all of the plurality of partial object images are given, assigning an appropriate weighting factor to each value of the measure of similarity between the partial object images and the partial reference images that have a correspondence relationship recorded in the image correspondence table, summing the weighted values of the measure of similarity, and outputting the sum as the degree of matching;
wherein the weighting factor satisfies a condition in which the distance between a first point representing the local structural feature contained in each of the plurality of partial object images and a second point representing the local structural feature contained in each of the plurality of partial reference images is less than or equal to a predetermined threshold and is the number of combinations of the first and second points that have a correspondence relationship recorded in the image correspondence table.

31. The image matching program product according to claim 23, wherein the local structural feature is at least one feature selected from the group consisting of a mole, fleck, freckle, pore and skin irregularity that appears in facial skin.

32. The image matching program product according to claim 23, further comprising:
a first image extracting step of extracting a first object region image from an input image and performing at least one operation from among: position adjustment, rotation and scaling of a subject image in the first object region image on the basis of a global structural feature of the first object region image to generate the object image; and
a second image extracting step of extracting a second object region image from a registered image and performing at least one operation from among: position adjustment, rotation and scaling of a subject image in the second object region image on the basis of a global structural feature of the second object region image to generate the reference image.

33. The image matching program product according to claim 32, wherein the global structural feature is a feature that appears in facial skin.

* * * * *